(12) United States Patent
Hata et al.

(10) Patent No.: US 7,003,182 B2
(45) Date of Patent: Feb. 21, 2006

(54) EMBEDDED TYPE OPTICALLY IRREVERSIBLE CIRCUIT

(75) Inventors: Kenjiro Hata, Tokyo (JP); Yoshinori Sato, Tokyo (JP)

(73) Assignee: TDK Corporation, (JP)

( * ) Notice: Subject to any disclaimer, the term of this patent is extended or adjusted under 35 U.S.C. 154(b) by 119 days.

(21) Appl. No.: 10/609,836

(22) Filed: Jun. 30, 2003

(65) Prior Publication Data

US 2004/0080828 A1 Apr. 29, 2004

(30) Foreign Application Priority Data

Jul. 3, 2002 (JP) .............................. 2002-194442

(51) Int. Cl.
*G02B 6/26* (2006.01)
(52) U.S. Cl. .............................. 385/11; 385/33; 385/43
(58) Field of Classification Search ................ 385/11, 385/31, 33–35, 43, 73–74; 359/484, 494, 359/496, 497
See application file for complete search history.

(56) References Cited

U.S. PATENT DOCUMENTS 5,706,371 A * 1/1998 Pan .............................. 385/11
5,848,203 A * 12/1998 Kawakami et al. ........... 385/11
6,621,630 B1 * 9/2003 Iwatsuka ..................... 359/484
2003/0021569 A1 * 1/2003 Sidorin ........................ 385/132

FOREIGN PATENT DOCUMENTS

| JP | 3-196115 | 8/1991 |
|----|----------|--------|
| JP | 6-230237 | 8/1994 |
| JP | 10-339848 | 12/1998 |
| JP | 2000-310750 | 11/2000 |

* cited by examiner

*Primary Examiner*—Frank G. Font
*Assistant Examiner*—Christopher M. Kalivoda
(74) *Attorney, Agent, or Firm*—Wood, Phillips, Katz, Clark & Mortimer

(57) ABSTRACT

An optical isolator having an optical element, comprised of an incoming side polarizer, a Faraday rotator, and an outgoing side polarizer superposed in the order of mention in the direction of an optical path, is embedded in the optical path of an optical fiber or optical waveguide having a light axis. The isolator has a slot extending across the light axis in a direction slanted with respect to the light axis. The optical element is inserted in the slot and the spaces between the optical element and the incoming and outgoing sides of the slot are filled with an optical adhesive portion. At least one of the interfaces is inclined at an angle reversely from the plane normal to the light axis as viewed from the slanted incoming side of the slot.

21 Claims, 12 Drawing Sheets

Relation between slot angle and connection loss of conventional embedded type optical isolator Relation between slot angle and attenuation of reflection of conventional embedded type optical isolator Attenuation of reflection vs. slot angle and thickness of element Relation between slot angle and slant angle of Faraday rotator Attenuation of reflection for gap length of 600μm vs. slot angle Condition of diffraction
$2(n_o - n_e)d = (M + 1/2)\lambda$

EMBEDDED TYPE OPTICALLY IRREVERSIBLE CIRCUIT

BACKGROUND OF THE INVENTION

This invention relates to an optically irreversible circuit device for use in optical communication, optical measurement and other similar fields.

DESCRIPTION OF THE RELATED ART

Semiconductor lasers ordinarily used as light sources for various optical systems are known to become instable in oscillation due to the incoming light reflected from the optical systems coupled to the lasers themselves. To prevent the trouble, optical isolators have come in use. In recent years the rapid spread of optical communication systems has spurred demand for more compact and less costly optical isolators than heretofore. With the optical isolators of conventional construction a semiconductor laser and an optical fiber are optically coupled through a lens, and an optical isolator element is disposed in the space between the lens and optical fiber so as to eliminate the reflective light. The construction necessarily calls for large overall dimensions and also requires positional adjustments of the lens and optical fiber.

A basic isolator layout of the prior art is illustrated in FIG. 19. A Faraday rotator 11 is sandwiched between a pair of polarizers 10a, 10b and is surrounded by a magnet 12 that magnetizes the rotator in a given direction. Between this isolator and two lengths of optical fiber 8a, 8b there must be located two condenser lenses 9a, 9b. The arrangement transmits light incident in the forward direction (the direction shown with the arrow C) but cuts off the light incident in the reverse direction (the direction of the arrow D). In this way the arrangement performs the functions as an isolator but calls for many optical elements, making the overall construction complex and large in size.

To overcome such complexity and follow a simpler procedure, structures in which the laser and optical fiber are coupled directly rather than through condenser lenses, with the elements arranged between the two lengths of optical fiber have thus far been proposed.

The optical isolators of such structures, known as "embedded" optical isolators, are fabricated by securely embedding an optical fiber in a substrate and fixing it with resin or the like, slotting the substrate by a dicing saw or other means across the optical fiber-embedded portions, further fitting the optical isolator elements into the slots, and bonding them securely in place. In this way, without the need of light axis matching, the fabrication of an optical isolator is greatly simplified. On the other hand, the light beam input from the optical fiber is diffracted as it travels through the element portions. The diffraction is rather substantial because the Faraday rotator must have a comparatively great thickness, or thick enough to set the angle of Faraday rotation to a desired value (usually 45 deg.). This produces problems such as a decrease in the volume of light that is coupled to the optical fiber on the outgoing side, or an increase in the so-called "insertion loss". Among the countermeasures being taken is local heating whereby the core of the optical fiber is expanded and the diffractability is reduced.

Thus, aligning optical isolator elements between two lengths of the optical fiber that directly receives a laser beam, gives an optical isolator that has no condenser lens and yet requires no light axis adjustment. When the plane of incidence of each optical isolator element is simply set normal to the light axis with respect to the light beam from the optical fiber on the incoming side, the reflected light from the surface of the optical isolator element travels back through the incoming side optical fiber to the laser, with a consequent unfavorable effect upon the oscillation of the laser. A method that has been adopted to prevent the above effect consists in disposing the elements at a given angle to the light axis. This arrangement prevents the reflected light from traveling back to the laser, but the refraction of the light beam as it travels through the optical isolator element section can result in a deviation of the transmitted light from the light axis. Where the optical isolator elements are located between the lengths of optical fiber in a pre-aligned state, the deviation from the light axis leads to an increased loss.

An optical isolator designed to correct such deviation from the light axis and achieve high reflective attenuation is disclosed in Japanese Patent Application Kokai No. 9-54283. However, the optical isolator is of a polarization-independent type, and its element arrangement uses a wedge type polarized beam splitter to enhance the polarization split, birefringent parallel plates to correct the light axis deviation, and a Faraday rotator.

The above element arrangement involves difficulties such as the complexity of structure, increased thickness of the individual elements, and costliness of the element assembly, whereas the optical isolator according to the present invention when employed as an LD module does not require such non-polarization-dependence. Another polarization-independent optical isolator has so far been proposed which uses thinner elements without the need of correction of positional deviation. The isolator causes little positional deviation in the forward direction, since the angle of incidence from the optical fiber is set to zero degree. In addition, the individual optical elements are provided by adhesion with anti-reflective coating for adhesive to control the reflective attenuation. Nevertheless, the reflection-preventive film usually used has a capacity limit of about 30 dB and hence the coated elements are unable to attain adequate properties.

A conventional optical isolator is shown in FIG. 1. The conventional isolator is fabricated by forming a slot 3 in a ferrule capillary 2 at a given angle to the light axis common to two lengths of optical fiber (TEC optical fiber as shown) 1a, 1b held within the capillary (the angle being indicated as a slot angle $\theta_g$ measured from a plane normal to the light axis), inserting an optical element comprised of an incoming side polarizer 4a, a Faraday rotator 5, and an outgoing side polarizer 4b in a superposed arrangement into the slot, and filling the remainder of the space with an optical adhesive 6 to form an integral structure. In the structure, the light beam from the optical fiber 1a incident on the incoming side polarizer 4a is reflected by the end face of the optical element, whereby the volume of backward reflected light $\eta_r$ can be decreased. Thus, the greater the slot angle the less the volume of reflected light. However, the deviation d of transmitted light from the light axis causes inadequate connection of the beam to the outgoing side optical fiber 1b, leading to an increased loss. Ordinarily, the Faraday rotator 5 and polarizers 4a, 4b are rectangularly shaped as in FIG. 1, and their surfaces constitute planes substantially parallel to those of the slotted walls. As a consequence, a slot machined to a given angle poses a problem of increasing quantity (distance) of deviation of the transmitted light $\eta_t$ from the light axis, as shown, the travel of the light beam.

By way of concrete example, typical two wavelengths for practical applications were used with the conventional isolator illustrated in FIG. 1, and calculations were made under the following conditions:

| (1) | Wavelength of light beam: | 1.31 μm |
|---|---|---|
| | Optical fiber: | spot size = 15 μm |
| | | (mode field dia.: 30 μm) |
| | | Refractive index n0 = 1.45 |
| | Slot width: | 400 μm |
| | Glass polarizer: | width = 60 μm |
| | | Refractive index n2 = 1.51 |
| | Faraday rotator thickness: | width = 250 μm |
| | | Refractive index n3 = 2.41 |
| | Optical adhesive: | overall thickness = 30 μm |
| | | Refractive index n1 = 1.51 |
| (2) | Wavelength of light beam: | 1.55 μm |
| | Optical fiber: | spot size = 15 μm |
| | | (mode field dia.: 30 μm) |
| | | Refractive index n0 = 1.45 |
| | Slot width: | 520 μm |
| | Glass polarizer: | width = 60 μm |
| | | Refractive index n2 = 1.51 |
| | Faraday rotator thickness: | width = 370 μm |
| | | Refractive index n3 = 2.41 |
| | Optical adhesive: | overall thickness = 30 μm |
| | | Refractive index n1 = 1.51 |

FIG. 2 shows the relation between the slot angle $\theta_g$ and the connection loss. It indicates that, with an optical isolator of the conventional structure as shown in FIG. 1, the greater the slot angle the larger the connection loss due to a corresponding increase in the light axis deviation d in addition to the diffraction loss on account of the slot.

FIG. 3 summarizes the result of calculation of return loss dependent on the slot angle upon incidence of a light beam from the optical fiber onto the optical element. It is obvious that the larger the slot angle the better the result.

In view of the foregoing, the conditions that satisfy the requirement of at least 60 dB for the return loss of an ordinary optical isolator are (1) at the wavelength of 1.31 μm, a slot angle of no less than 2 deg. and (2) at the wavelength of 1.55 μm, a slot angle of no less than 2.4 deg.

As for the insertion loss of an ordinary optical isolator, a limit of no more than 1 dB is necessary. The insertion loss of an optical isolator is the sum of the absorption loss of the optical element, reflection loss, connector loss (in the case of an isolator integrally combined with a connector), diffraction loss that reflects the connection loss of the slot wherein the element is inserted, and the loss due to positional deviation. Therefore, the connection loss of the element-embedded slot must be restricted to 0.5 dB or less. In view of this, the slot connection loss at the slot angle where the return loss is more than 60 dB is 0.4 dB (1) at the wavelength of 1.31 μm or 1.0 dB (2) at the wavelength of 1.55 μm. The isolator thus can be used with a wavelength of 1.31 μm but can hardly serve the purposes with a wavelength of 1.55 μm.

For the tolerance of fabrication, it is necessary to adopt a greater slot angle in order to attain the return loss in a stabilized matter and the angle for the wavelength of 1.31 μm is still unsatisfactory.

SUMMARY OF THE INVENTION

In order to solve the foregoing problems, the present invention corrects the light axis deviation by changing the configurations or layout of the component elements of optical isolator. To be more concrete, an interface of regions of different refractive indexes that cause reflection or refraction is obliquely provided with respect to the incoming light to a slot formed in an optical fiber or optical waveguide, whereby reflective return light is led to the outside of the light receiving angle of the optical fiber or optical waveguide, whereas the transmitted light is refracted to be incident on the component elements of the optical isolator, i.e., the polarizer and Faraday rotator. The light axis deviation is corrected and an increase in the loss is suppressed by changing the relative angle of the oblique interface between the regions of different refractive indexes and the diffraction plane of the optical element formed integrally with the regions of different refractive indexes.

Thus, the present invention solves the above-described problems by providing an embedded type optically irreversible circuit device in which an optical element, comprised of an incoming side polarizer, a Faraday rotator, and an outgoing side polarizer superposed in the order of mention in the direction of an optical path, is embedded in the optical path of an optical fiber or optical waveguide having an light axis, the device has a slot extending across the light axis in a direction slanted with respect to the light axis, the optical element is inserted in the slot and the spaces between the optical element and walls on the incoming and outgoing sides of the slot are filled with an optical adhesive portions; and at least one of interfaces between the incoming side polarizer, the Faraday rotator, the outgoing side polarizer and the optical adhesive portions is inclined at an angle opposite to the slanted wall on the incoming side of the slot as measured from a plane normal to the light axis.

In a typical aspect of the invention, the embedded type optically irreversible circuit device is characterized in that the polarizers on the incoming side and the outgoing side of the optical element inserted in the slot are wedge-shaped, with the polarizer planes facing the optical fiber or waveguide being inclined substantially in the same direction as the slant angle of the slot whereas the polarizer planes facing the Faraday rotator as well as the both planes of the Faraday rotator being inclined at an angle opposite to the slanted wall on the incoming side of the slot, respectively, as measured from a plane normal to the light axis, and that the both planes of the Faraday rotator are joined integrally to the planes of the incoming and outgoing side polarizers.

The polarizers to be used are preferably thin ones so as to minimize the diffraction loss of the slot. The pieces of glass polarizer often used in common optical isolators have a thickness of about 500 μm. Even thinner ones have a thickness of about 200 μm.

Such a glass polarizer has minute spheroidal metal particles oriented in layers 30 to 80 μm thick inwardly from the both glass surfaces, and it is these layers that perform the light polarizing function. Therefore, only one of the both side layers of the minute spheroidal metal particles formed on the both sides of the glass polarizer may be utilized to provide a polarizer as thin as 30 to 80 μm. This makes it possible to obtain an embedded type optical isolator with low slot diffraction loss. It is true that the layer of minute spheroidal metal particles on the glass polarizer to exhibit a polarizing function is now half that of the existing glass polarizer and the extinction ratio is deteriorated. From the viewpoint of isolation by an embedded type isolator, however, the isolator may adequately be utilized for LD module because the deterioration of isolation is limited for the operating temperature range and wavelength range, though the peak isolation in the operating center wavelength is deteriorated.

In addition, cost reduction is realized because two glass polarizer elements can be obtained from a single piece of glass polarizer.

Thus, the invention provides an embedded type optically irreversible circuit device comprising an optical element made by superposing an incoming side polarizer, a Faraday rotator, and an outgoing side polarizer are superposed in the order of mention in the direction of the optical path, the polarizers used are pieces of glass polarizer each comprising a layer of minute spheroidal metal particles oriented and formed on either side of a glass substrate in the direction of the optical path.

Among other possible optical element arrangements is the use of birefringent waveplates to produce a phase difference for interference in the optical path. This element is comprised of a first birefringent region, a second birefringent region, and a fifth adhesive region bonding the two birefringent regions together on one side of a Faraday rotator, and also comprised of a third birefringent region aligned to the first birefringent region, a fourth birefringent region aligned to the second birefringent region, and a sixth adhesive region bonding the two birefringent regions together on the other side of the Faraday rotator. The optical axes of the individual birefringent plates are in such relations that the first and second birefringent regions are located intersecting the third and fourth birefringent regions at 90° to each other, and the optical axes of the first and third birefringent regions are at angles of about 45° to the second and fourth birefringent regions. The Faraday rotator is of a thickness having a rotation angle of 45° with the wavelength used.

Where quartz waveplates are used as the birefringent plates, the plate thickness is generally 41 μm for a wavelength of 1.31 μm and 48 μm for 1.55 μm, thus rendering it possible to obtain thin optical element arrangements.

Since the afore-described optical element structure using the birefringent plates gives birth to a polarization-independent embedded type optical isolator, the product may be used in in-line applications other than for LD modules.

It is further possible to realize an embedded type optical isolator that brings both low loss and high return loss, by partly enlarging the core diameter of an optical fiber or optical waveguide, slotting the expanded core portion, and then inserting any of the afore-described optical elements into the slot.

In a more concrete element arrangement, the refractive indexes of the optical fiber, optical adhesive portions, incoming side polarizer, Faraday rotator, and outgoing side polarizer which the device comprises are in the relation, optical fiber $n0 \leq$ optical adhesive $n1 \leq$ incoming side polarizer $n2a$ (=outgoing side polarizer $n2b$)<Faraday rotator $n3$, and the Faraday rotator is inclined at an angle opposite to the slanted wall on the incoming side of the slot as measured from a plane normal to the light axis. The irreversible circuit device thus fabricated makes it possible to correct easily the light axis deviation due to the slanted position of the element and achieve high return loss.

More broadly, the present invention provides an embedded type optically irreversible circuit device in which an optical element, comprised of a plurality of incoming side optical members, a Faraday rotator and a plurality of outgoing side optical members superposed in the order of mention in the direction of an optical path, is embedded in the optical path of an optical fiber or optical waveguide having a light axis, the device has a slot extending across the light axis in a direction slanted with respect to the light axis, the optical element is inserted in the slot and the spaces between the optical element and walls on the incoming and outgoing sides of the slot are filled with an optical adhesive portions; and least one of interfaces between the incoming side optical members and the Faraday rotator is inclined at an angle opposite to the slanted wall of the slot on the incoming side as measured from a plane normal to the light axis, in such manner that the following relationship is satisfied:

$$nf < n1*L1/L + n2*L2/L + n3*L3/l + \ldots < nr,$$

where nf: refractive index of the optical fiber,
   L: distance from the incoming side optical fiber to the Faraday rotator,
      n1, n2, n3 . . . : refractive indexes of the materials inserted between the incoming side optical fiber to the Faraday rotator,
      L1, L2, L3 . . . : Thickness of the materials,
   nr: refractive index of the Faraday rotator, the materials inserted between the incoming side optical fiber to the Faraday rotator are comprised of a polarizer and refractive index of the polarizer is no more than refractive index of the Faraday rotator.

The invention further provides an irreversible circuit device which functions as it stands by embedding an optical element, comprised of an incoming side polarizer, a Faraday rotator, and an outgoing side polarizer superposed in the order of mention in the direction of an optical path, in the optical path of an optical fiber or optical waveguide having a light axis, characterized in that the slot in which the optical element is inserted has wall surfaces reversely inclined to the light axis direction, an optical adhesive is introduced into the space between the optical element and incoming and outgoing walls of the slot to fill it up to form optical bonding portions, and at least one of interfaces between the incoming side polarizer, the Faraday rotator, the outgoing side polarizer and the optical adhesive portions is inclined at an angle opposite to the slanted wall on the incoming side of the slot as measured from a plane normal to the light axis. In this embodiment the slot flares upward to facilitate the observation of the slotted side walls and permits direct inspection. The side walls can be reground or mirror finished, e.g., with a straight cut grinding wheel, lapping film in which a diamond abrasive or the like is dispersed, or abrasive stick. Thus, the embedded type part is improved in quality and yield.

As for the polarizers, it is practically impossible to use birefringent prism polarizers and birefringent polarized plate splitter (such as of rutile) for the embedded type, because they make it difficult to reduce the element thickness to attain adequate optical characteristics and require such great slot width that invites an increase in the diffraction loss.

The arrangement according to the present invention permits refraction of light within an optical isolator element in the direction opposite to the ordinary direction by imparting a certain angular difference that is calculated from the thickness and refractive index of the optical isolator element and from the angle at which the element is disposed between two lengths of optical fiber to the incoming and outgoing planes of one or more component elements of the optical isolator. Consequently, the light axis deviation that results from the tilting of the incoming and outgoing planes of the element and the slot so as to reduce the reflection return light is corrected by the whole element, and an optical isolator of limited reflection return light and low loss is realized. Moreover, with no need for lens, a small-size, low-cost optical isolator and LD module equipped with the optical isolator can be provided.

Is a sectional view of a conventional embedded type optical isolator.

FIG. 2

Is a graphic representation of the relation between the slot angle $\theta_g$ and connection loss of conventional embedded type optical isolators.

FIG. 3

Shows the results of calculation of the return loss dependent on the slot angle upon the incidence of light from optical fibers on optical elements.

FIG. 4

Is a graph showing the relation between the optical fiber gap and the diffraction loss where only there is air in the gap between two lengths of optical fiber.

FIG. 5

Is a graph showing the relation between the optical fiber gap and the diffraction loss where the refractive index n of the space filled with an optical adhesive is 1.51 and a Faraday rotator having a thickness of 370 μm as fixed is inserted in place.

FIG. 6

Illustrates an embodiment of the optical isolator of the present invention.

FIG. 7

Is a graph showing the relation between the fiber gap and the return loss at different slot angles.

FIG. 8

Is a graph showing the relation between the slot angle $\theta_g$ and the angle $\theta_f$ at which the positional deviation from the former is corrected.

FIG. 9

Shows the relation between the slot angle $\theta_q$ with a slot width of 600 μm (wavelength=1.55 μm) and the return loss.

FIG. 10

Is a graph comparing a conventional optical isolator and an optical isolator embodying the present invention in respect of the connection loss at varying slot angle.

FIG. 11

Is a graph showing the return loss at varied slot angles.

FIG. 12

Illustrates another embodiment of the optical isolator of the invention not using wedge-shaped glass polarizer.

FIG. 13

Shows an optical element for use in still another embodiment of the invention.

FIG. 14

Indicates a tendency of increasing element thickness with wedge shaping of glass polarizer.

FIG. 15

Is a graph showing the relation between the extinction ratio of glass polarizer and isolation.

FIG. 16

Is a graph showing the temperature characteristics of isolation by typical optical isolators.

FIG. 17

Is a cross section of yet another embodiment of the invention.

FIG. 18

Is a cross section of a further embodiment of the invention.

FIG. 19

Is a schematic view of a conventional optical isolator.

FIG. 20

Shows a schematic view of the optical isolator according to a second prototype example.

FIG. 21

Shows a schematic view of the optical isolator according to a third prototype example.

DESCRIPTION OF THE PREFERRED EMBODIMENTS

Figure 1:
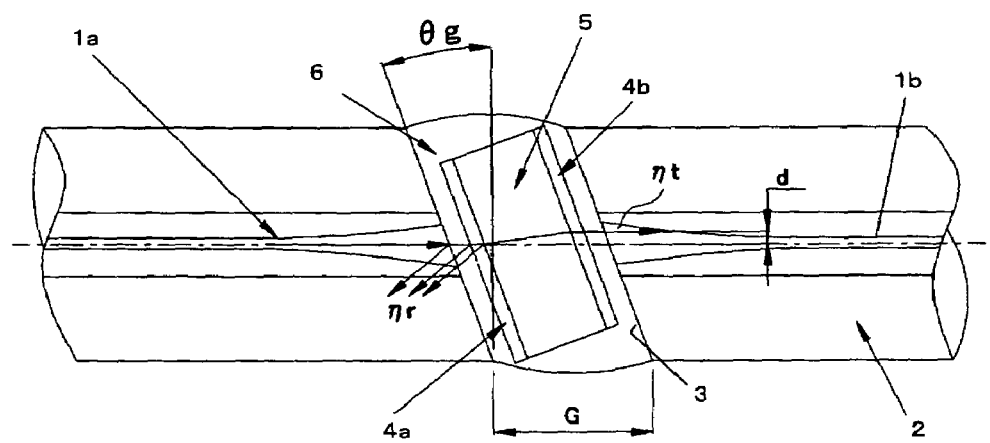
FIG. 1
Figure 2:
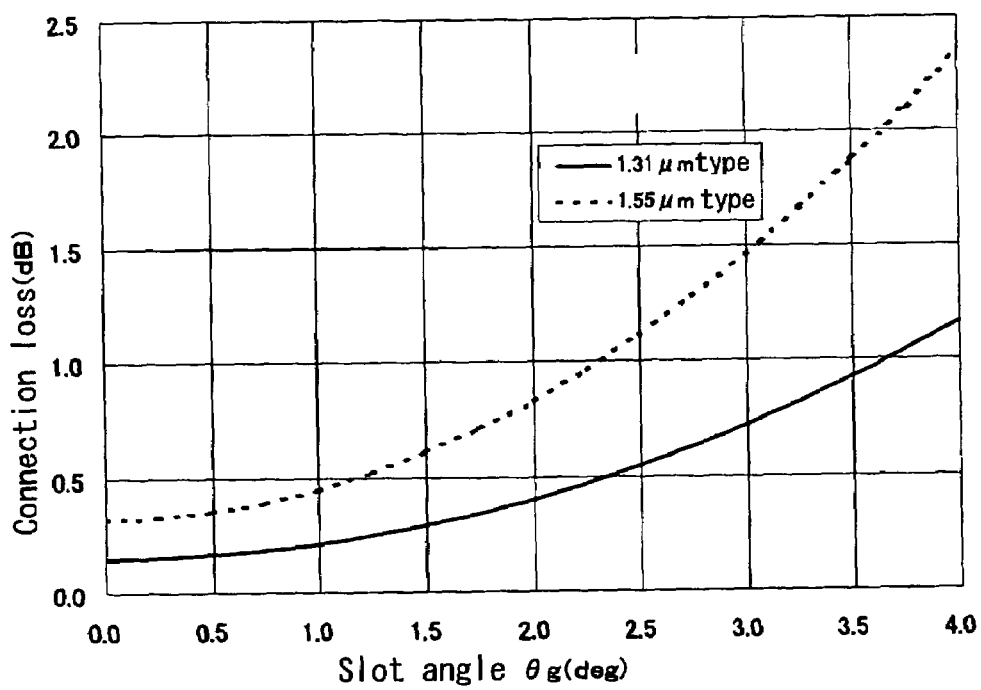
Figure 3:
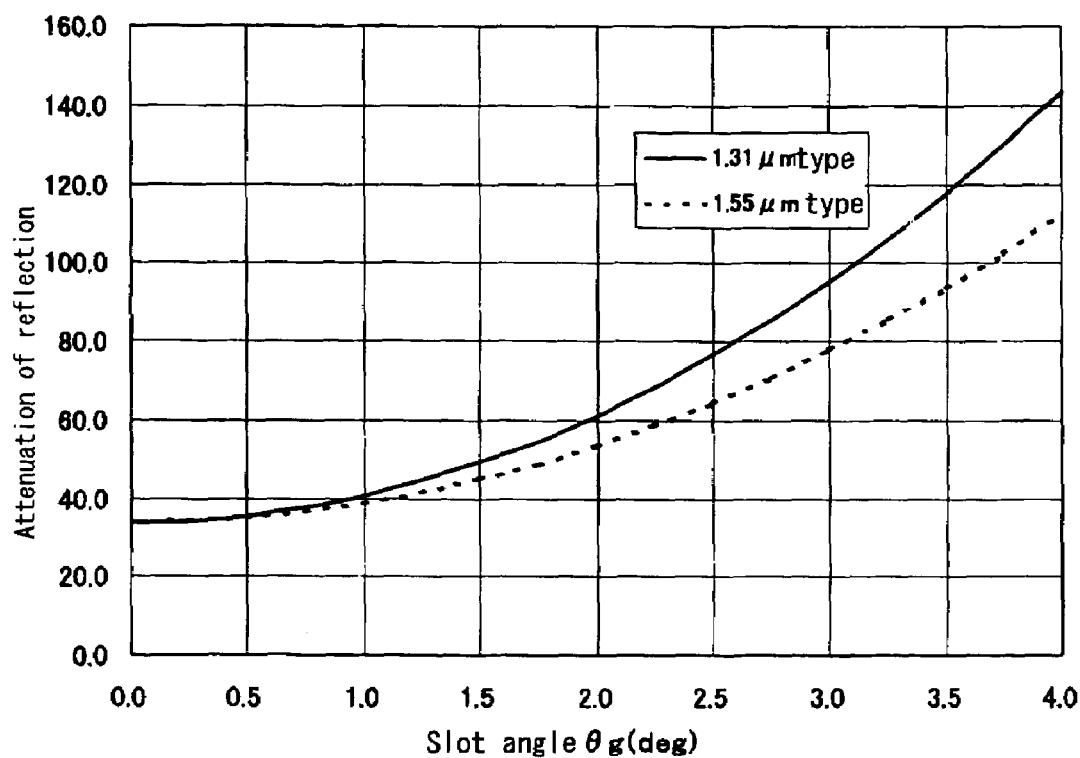
Figure 6:
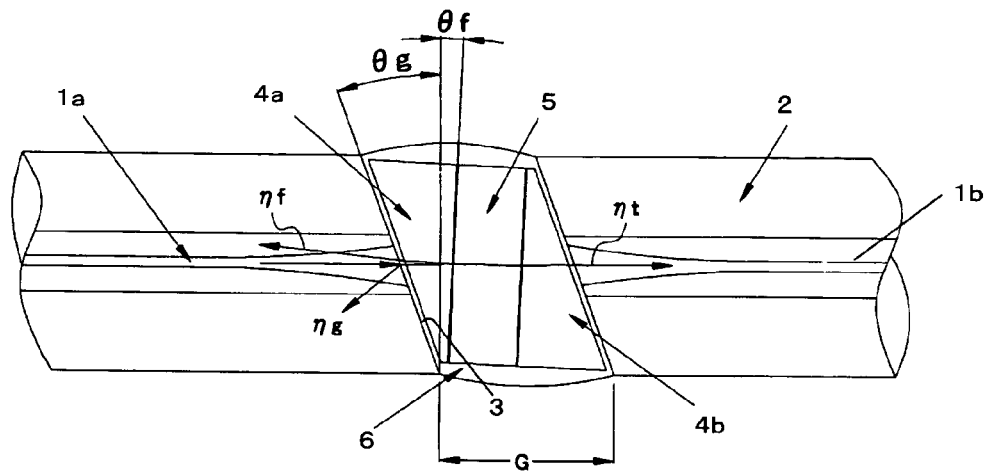

An optical isolator conforming to the present invention will now be described in detail. The isolator is taken up as an example of the embedded optically irreversible circuit device according to the invention. FIG. 6 illustrates an embodiment of the invention wherein parts corresponding to like parts in FIG. 1 are designated by like numerals or symbols. Referring to the figure, the optical isolator is fabricated by forming a slot 3 in a ferrule capillary 2 at a given angle to the light axis common to two lengths of optical fiber (TEC optical fiber expanded at one end as shown) 1a, 1b held within the capillary (the angle being indicated as a slot angle $\theta^g$ measured from a plane normal to the light axis), inserting an optical element comprised of a wedge-shaped incoming side polarizer 4a, a Faraday rotator 5, and a wedge-shaped outgoing side polarizer 4b in a superposed arrangement into the slot, and filling the remainder of the space with an optical adhesive 6 so that an integral structure is made. The incoming side polarizer 4a and the outgoing side polarizer 4b of the optical element thus inserted are both wedge-shaped such that their planes facing the two lengths of optical fiber 1a, 1b, respectively, are inclined in substantially the same direction as the walls of the slot 3 at the tilt angle $\theta_g$ and their planes facing the Faraday rotator 5 are inclined at an angle $\theta_f$ in the direction opposite or reverse to the tilt angle of the slot 3 (or inclined as shown at an tilt angle $\theta_f$ as measured from a plane normal to the light axis). The both faces of the Faraday rotator 5 are inclined integrally in conformity with the faces of the polarizers on both incoming and outgoing sides, as inclined at the same angles as the planes of the both polarizers inclined in the opposite directions.

Under the invention, as will be appreciated from FIG. 6, the positional deviation caused by the refraction at the slot angle $\theta_g$ is corrected by the angle of location $\theta_f$ of the Faraday rotator. The angle $\theta_f$ for correction is smaller than the slot angle, and therefore the reflected light $\eta_f$ at the surface of the Faraday rotator must be taken into account. The reflected light $\eta_f$ develops a deviation of an angle twice that of the beam incident on the Faraday rotator, and this angular deviation results in an light axis deviation over a range twice the distance between the optical fiber and Faraday rotator. Consequently, even if the angle $\theta_f$ is relatively small, the volume of light that comes back to the fiber is decreased.

Figure 8:
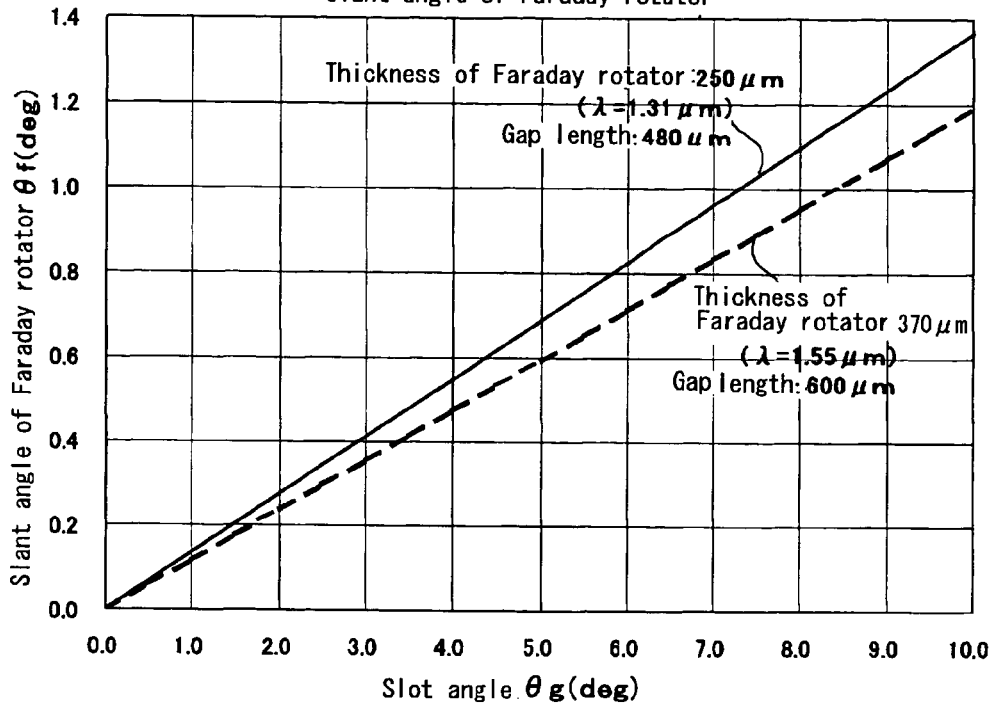
Figure 9:
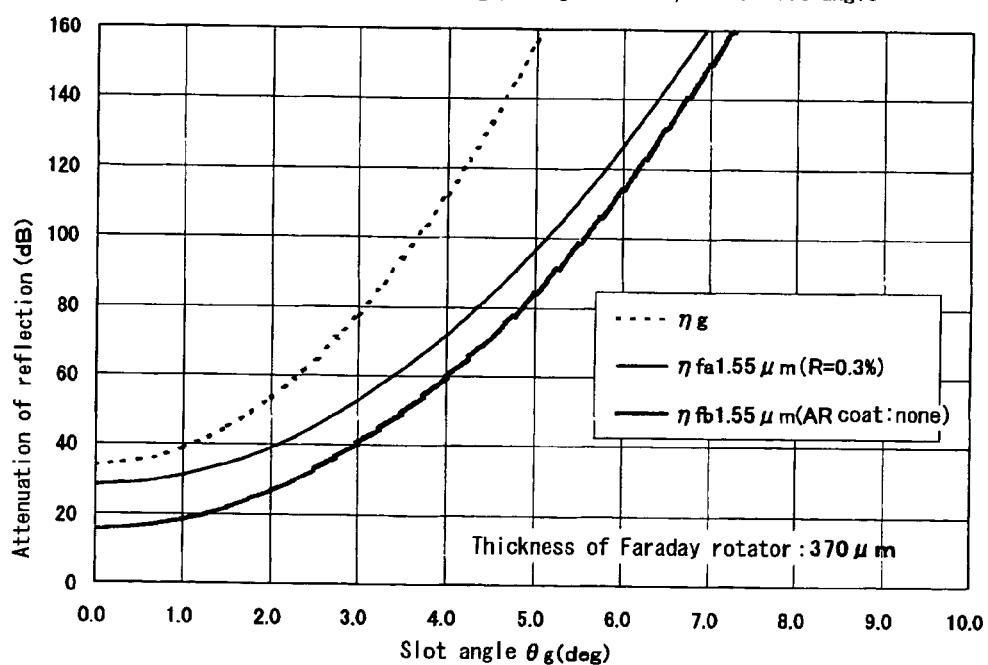

This relationship was calculated under the following predetermined conditions, and the results are given in FIGS. 8 and 9. FIG. 8 indicates the values of the angle $\theta_f$ at which the positional deviation from the slot angle $\theta_g$ is corrected, with respect to light beams having wavelengths of 1.31 μm and 1.55 μm. FIG. 9 shows the relation between the slot angle $\theta_g$ and return loss with a slot width of 600 μm (wavelength=1.55 μm.

Refractive Indexes of Component Elements

Fiber : n0=1.45; optical adhesive : n1=1.51; polarizer: n2 =1.51; Faraday rotator : 2.41.

TEC Optical Fiber

Spot size ω=15 μm (MFD=30 μm).

As can be seen from FIGS. 8 and 9, when the slot angle $\theta_g$=5° in view of the tolerance in the case of the slot width of 600 μm, the angle $\theta_f$ is approximately 0.6° but the return loss is 80 dB or more.

For the purposes of the invention the glass polarizer must be kept at the angle $\theta_f$ from the Faraday rotator by either using a wedge-shaped glass polarizer or forming a wedge-shaped region of optical adhesive having substantially the same refractive index as the glass polarizer. In the latter case, the glass polarizer is flat and the space between the opposing surfaces of the glass and the Faraday rotator is filled up with optical adhesive. In that case the slot width is increased accordingly as the size of the wedge region, but the increase is negligible in consideration of the loss due to the positional deviation of the light axis.

Figure 4:
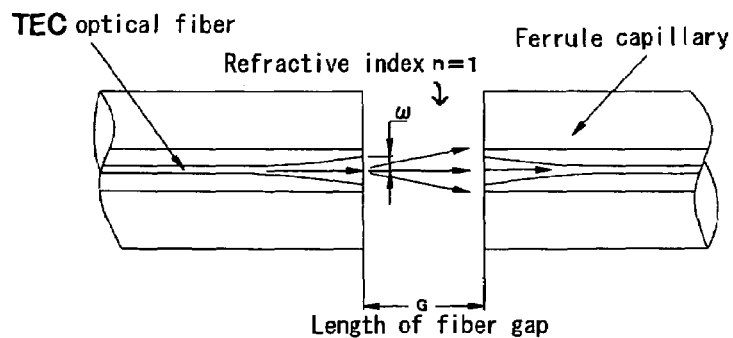
Figure 4:
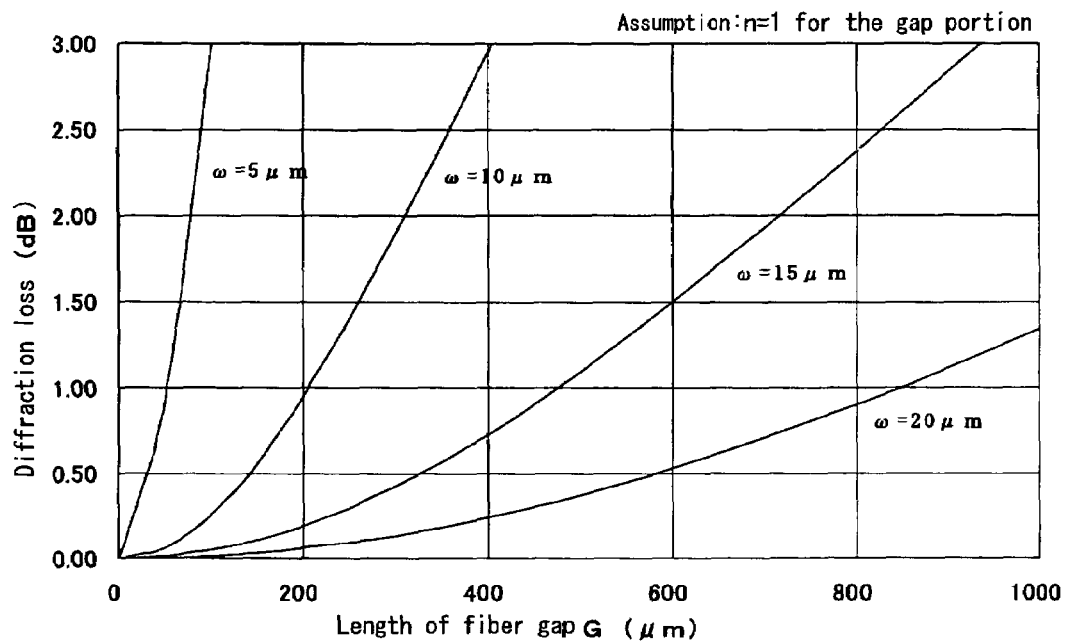
Figure 5:
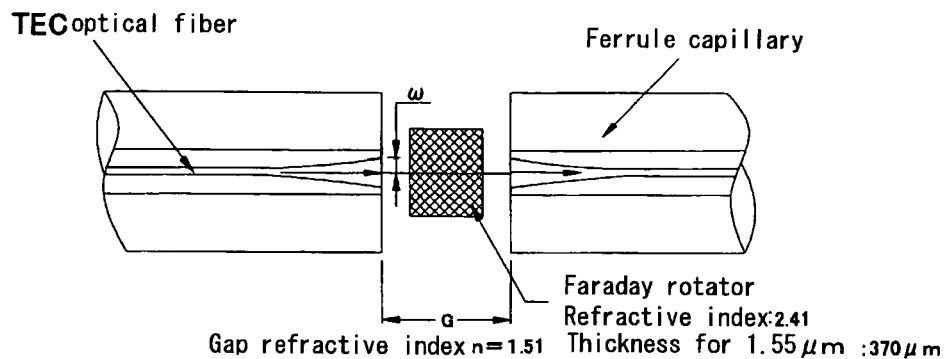
Figure 5:
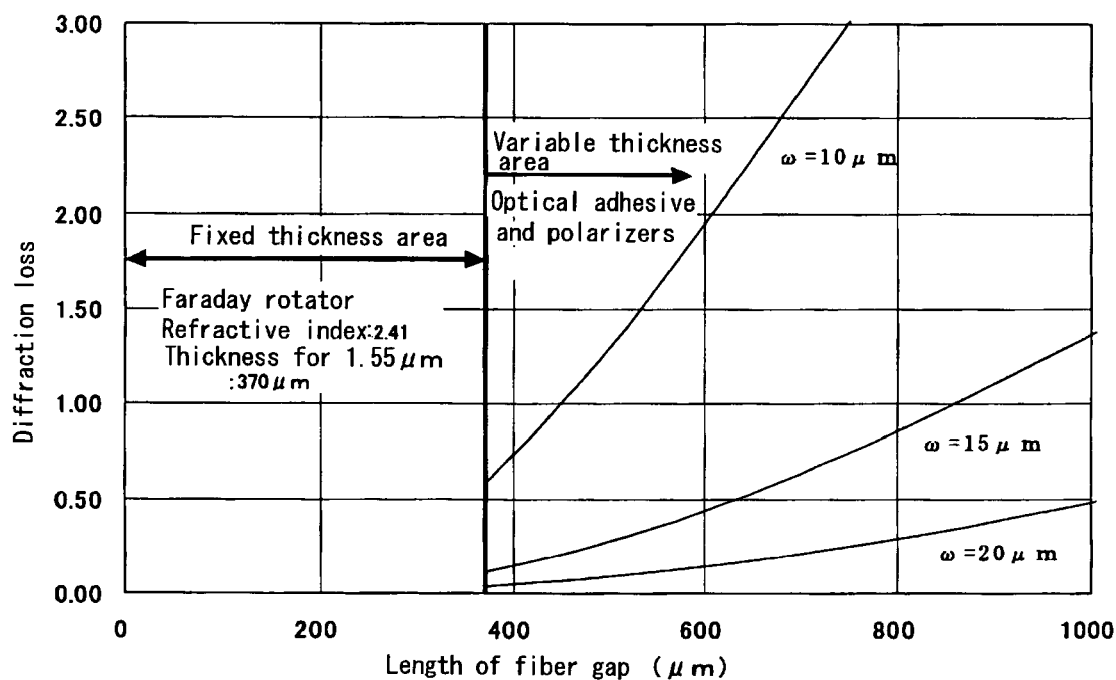

The relation between the fiber-to-fiber spacing or gap and the diffraction loss is shown in FIGS. 4 and 5. FIG. 4 illustrates the case in which only there is air in the slot between two lengths of optical fiber. FIG. 5 assumes that the slot space filled with optical adhesive has a refractive index n=1.51, with a Faraday rotator having a fixed thickness of 370 μm embedded in the slot.

The loss of the element-embedded slot should be kept below 0.5 dB, and assuming that the expanded-core fiber has a spot size ω=15 μm that permits stabilized manufacture, it can be seen from FIG. 5 that a fiber gap of no more than 600 μm is desirable for the wavelength of 1.55 μm with a thick Faraday rotator, in the element performance.

Figure 7:
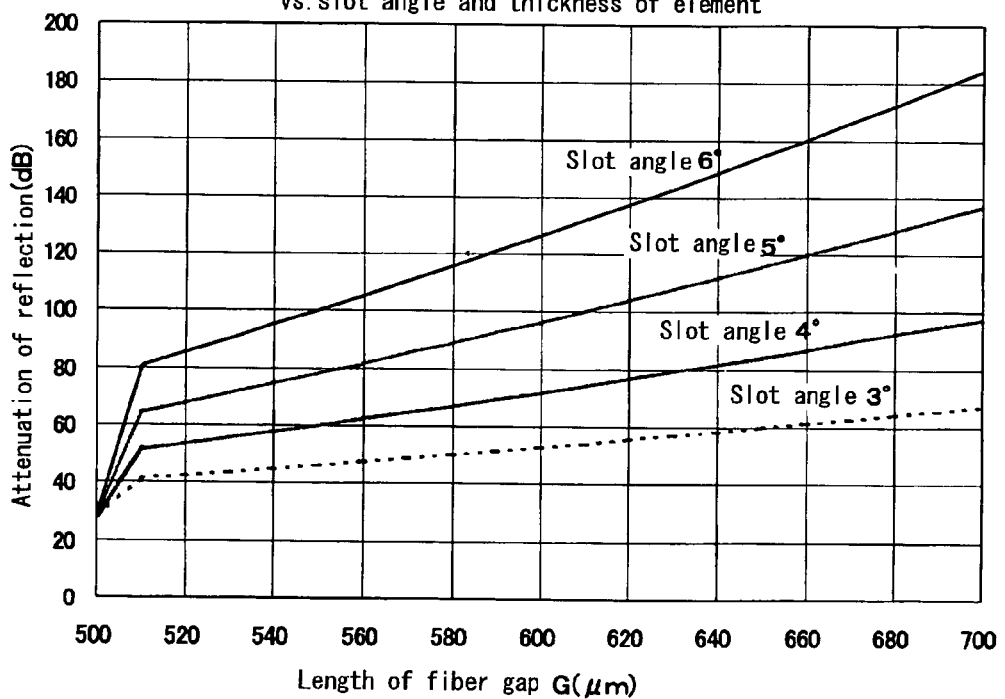

The relation of fiber gap versus return loss by slot angles is indicated in FIG. 7. The conditions of the individual elements were the same as in FIGS. 8 and 9; i.e., n0=1.45; optical adhesive : n1=1.51; polarizer : n2=1.54; Faraday rotator : 2.41; TEC optical fiber spot size ω=15 μm.

From the foregoing it is now possible to fabricate a desirable optical isolator with a slot angle of about 5° (wedge angle=5.6°) and a fiber gap of no longer than 600 μm.

Figure 14:
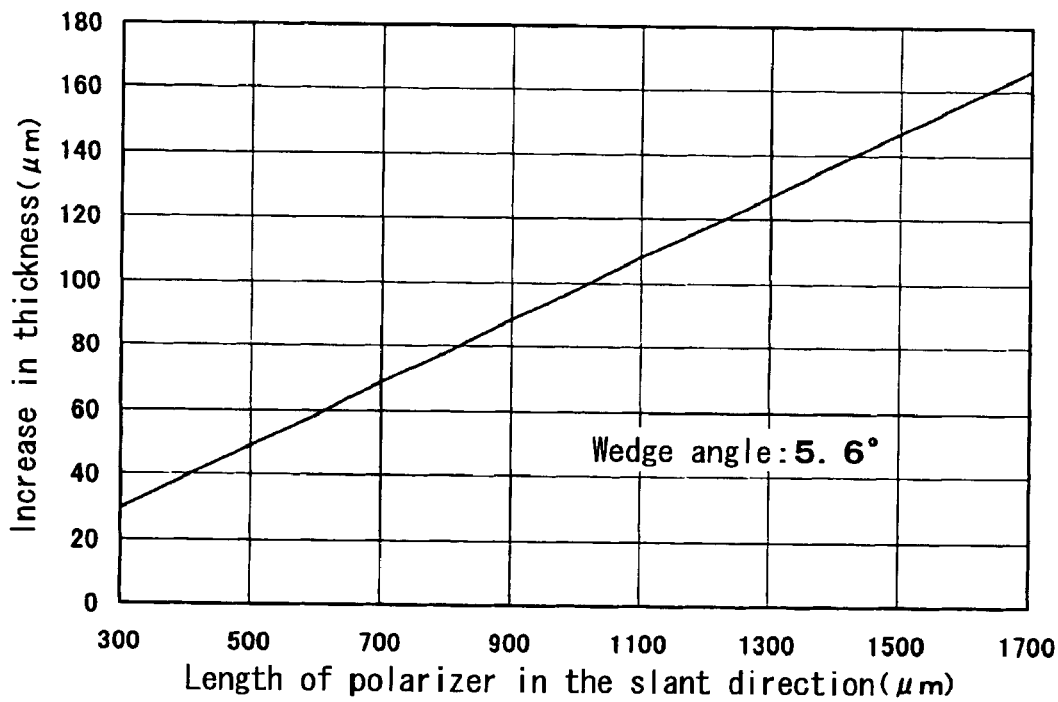

A tendency of increasing overall element thickness with increases in the angle of wedge-shaped glass polarizer is represented in FIG. 14. In the case of an optical element assembly for a wavelength of 1.55 μm, the Faraday rotator is 370 μm thick and two plates of glass polarizer, each having a region of 50 μm necessary to function as such, requires a combined thickness of 100 μm. Thus, the overall thickness of the optical element unit is 370+100=470+ the increment α of wedge angle.

The increment α is equivalent to the limit of diffraction loss 600 μm−470 μm=130 μm. Accordingly, from FIG. 14 the element to be used with an increment of 130 μm has a size (dimension in the inclining direction of the glass polarizer) is calculated to be 1.3 mm. In practice, an optical element having a size of about 0.5 mm adequately serves the purpose, and the increase in the diffraction loss with the increment in the thickness of the element is comparatively small.

Figure 10:
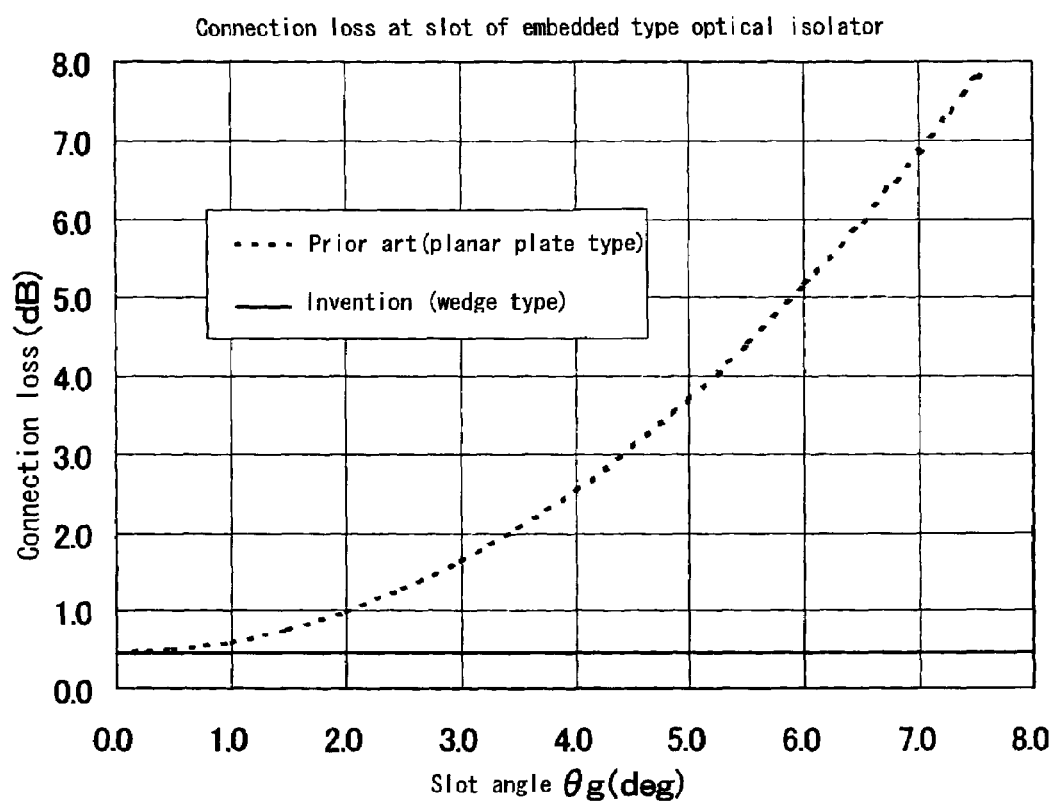
Figure 11:
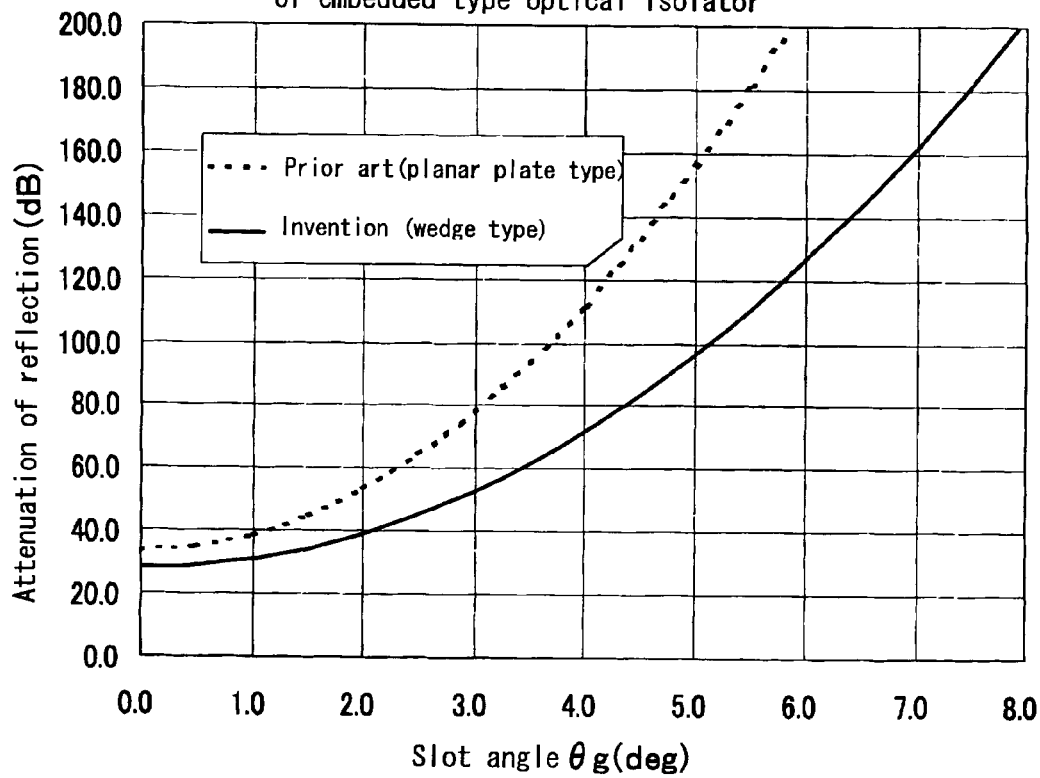

To sum up, the connection losses with different slot angles of optical isolators of the prior art and of the present invention are shown in FIG. 10 and the return loss with different slot angles of those isolators are shown in FIG. 11. As FIG. 10 indicates, the embedded type optical isolator according to the present invention renders it possible to set the connection loss to a minimum value not dependent on the slot angle while keeping the return loss at a sufficiently large value.

Figure 12:
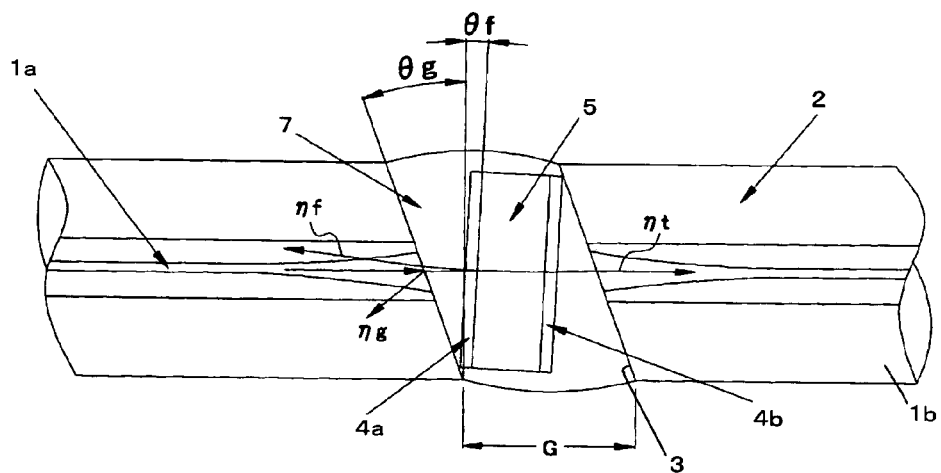

FIG. 12 illustrates another embodiment of the optical isolator of the invention which does not use any wedge-shaped glass polarizer. There are shown an incoming side polarizer 4a, a Faraday rotator 5, and an outgoing side polarizer 4b are integrally superposed to form a rectangular optical element. The element is placed in a slot 3 formed at a slot angle $\theta_g$ to a plane perpendicular to the light axis of the optical fiber, in a state inclined at an angle $\theta_f$ in the direction opposite to the slot angle relative to the plane perpendicular to the light axis. The space around the element is filled up with an optical adhesive 7 having, for example, the same refractive index as the polarizers. Here the optical adhesive 7 forms a wedge having an angle $\theta_g+\theta_f$ between both incoming and outgoing side walls of the slot 3 and the front and rear faces of the optical element. Thus, this embodiment can be designed under the same conditions as those of the first embodiment described above, obviously with the same functions and effects.

Figure 13:
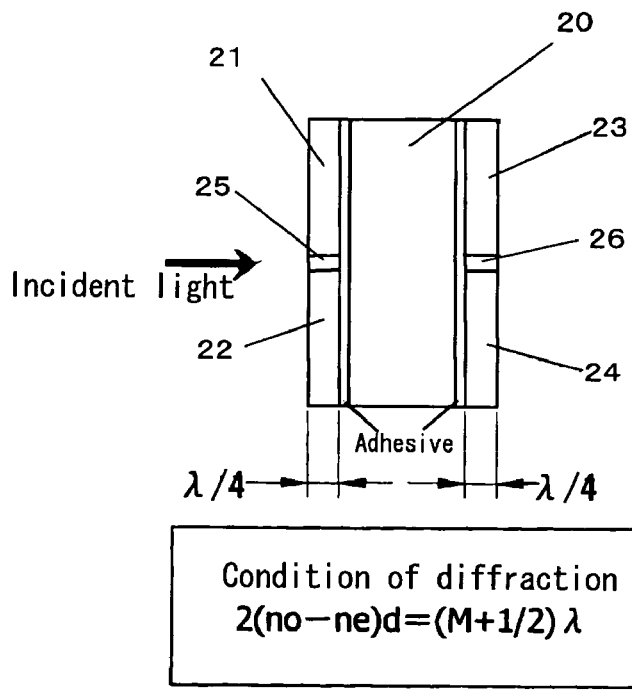

FIG. 13 shows an optical element for use in yet another embodiment of the invention. This element is comprised of a first birefringent region 21, a second birefringent region 22 and a fifth adhesive region 25 bonding the two birefringent regions together on one side of a Faraday rotator, and also forming a third birefringent region 23 aligned to the first birefringent region, a fourth birefringent region 24 aligned to the second birefringent region, and a sixth adhesive region 26 bonding the two birefringent regions together on the other side of the Faraday rotator. The optical axes of the individual birefringent plates are in such relations that the optical axes of the first and second birefringent regions are at an angle of 90° and the optical axes of the third and fourth birefringent regions at an angle of 90°, and the optical axes of the first and third birefringent regions are at an angle of about 45° and the optical axes of the second and fourth birefringent regions are at an angle of about 45°. The Faraday rotator is of a thickness having a rotation angle of 45° with the wavelength used. The beam spot of incident light is designed to fall on the first and second birefringent regions 21, 22, centering on the fifth adhesive region 25. This optical element is polarization-independent. Here the satisfactory light diffraction conditions are:

$$2(no-ne)d = (M+\frac{1}{2})\lambda$$

where no is ordinary light refractive index, ne is extraordinary light refractive index, d is thickness, λ is wavelength, and M is an arbitrary integer.

This optical element is placed in a slot 3 similar to the one shown in FIG. 12, and the space around it is filled up with an optical adhesive 7 similar to that used in FIG. 12 to make up an embedded type optical isolator. From the refractive indexes of the various parts of the optical element and also from the refractive index of the optical adhesive, the given angle $\theta_f$ of reverse inclination can be computed.

Referring back to FIG. 6, a modified form of the embodiment will now be explained.

In the modified embodiment, glass polarizer plates, each comprising a minute metal particle-oriented surface formed on one side, are used as polarizers 4a, 4b, in such manner that the minute metal particle-oriented sides face optical fiber ends. The space between the glass polarizer plates and the Faraday rotator is filled with an optical adhesive having the same refractive index as the glass polarizer. In this way an optical isolator of substantially the same structure as the embodiment in FIG. 6 is obtained. In this connection some study will be made. An optical isolator using ordinary glass polarizer (minute metal particles oriented on both sides) and an optical isolator using a glass polarizer deprived of the particles on one side and deteriorated in extinction ratio may be compared in respect of their properties as follows:

Extinction Ratio of Ordinary Glass Polarizer
  Standard=at least 40 dB.

Extinction Ratio of Specially (One Side) Processed Glass Polarizer
  Approximately 30–33 dB.

Figure 15:
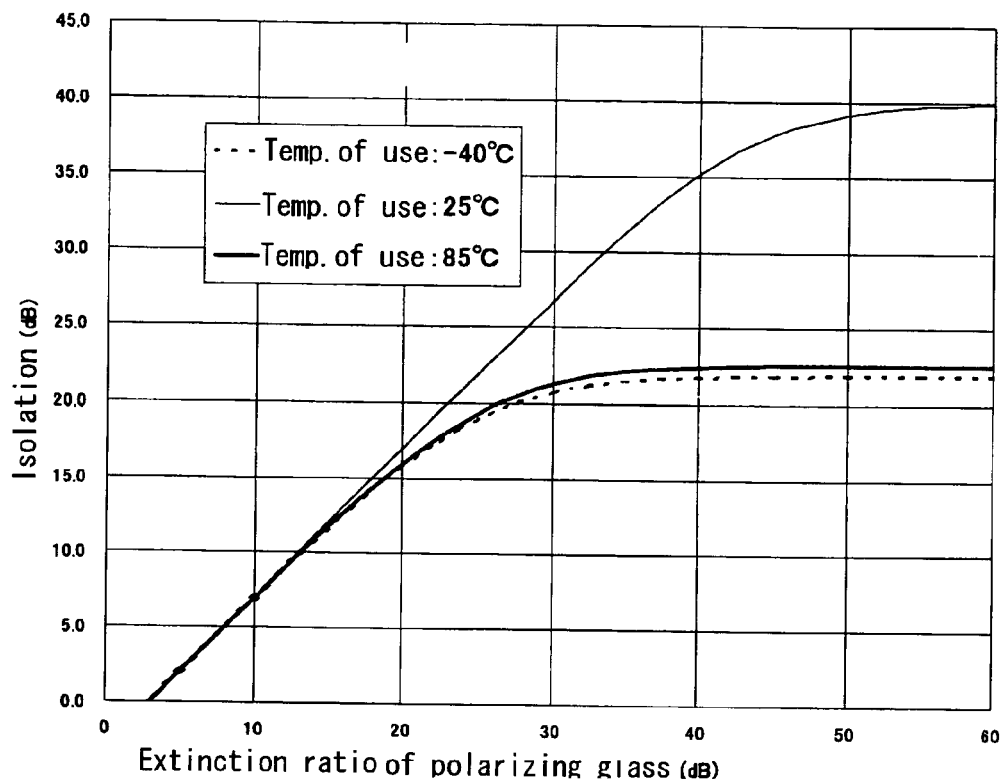

FIG. 15 represents the relation between the extinction ratio of glass polarizer and isolation. It will be seen from the graph that the deterioration of isolation is relatively low when the extinction ratio is no less than 30 dB in a operating temperature range of −40° C. to 85° C.

Figure 16:
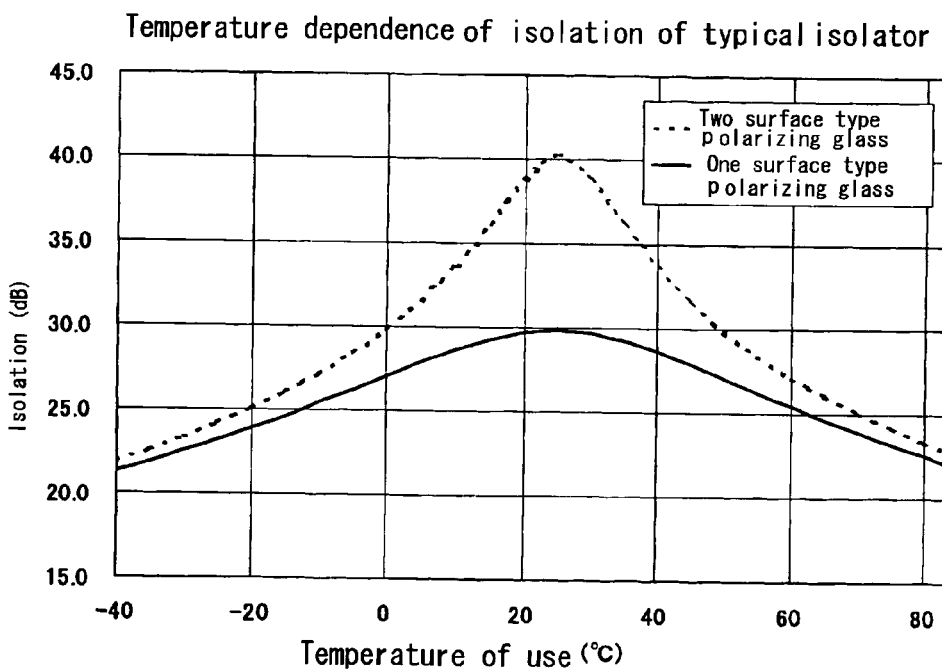

FIG. 16 shows the temperature dependence of isolation of typical optical isolators. It should be clear that the isolation by means of the isolator using one side-processed polarizers is somewhat inferior to the isolation using both side-processed polarizers but is more stable in the same operating temperature range.

Figure 17:
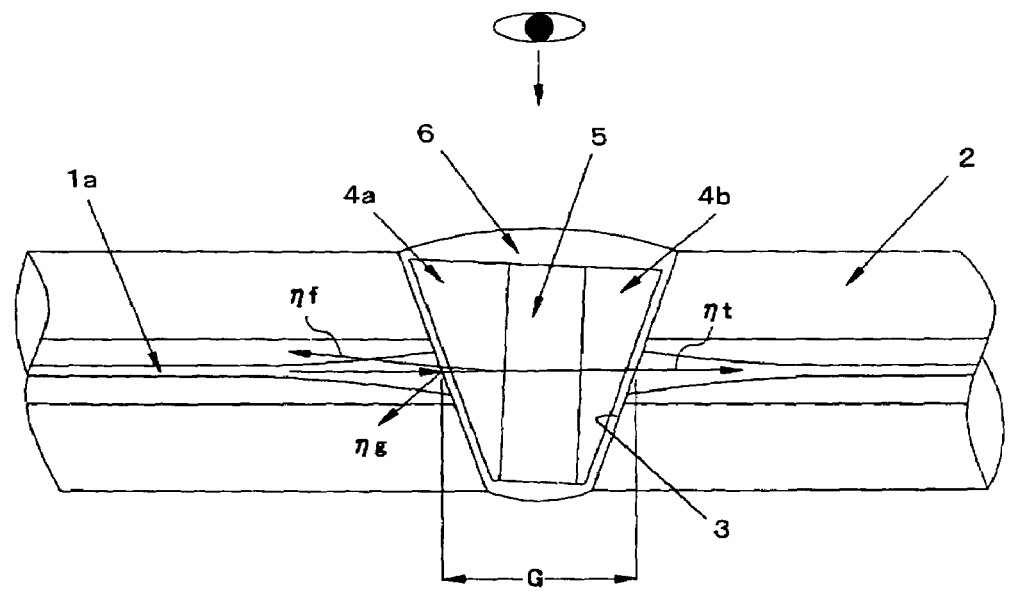

FIG. 17 shows still another embodiment of the invention. This embodiment differs from the embodiments thus far described in that the walls on the incoming and outgoing sides of the slot 3 formed between two lengths of optical fiber are inclined inversely to each other or expanding upward. The incoming side polarizer 4a and the outgoing side polarizer 4b are in the form of wedges flaring upward. They are arranged at the same height so that the positional deviation of light caused by the incoming side polarizer 4a is made up for by the outgoing side polarizer 4b. This construction permits inspection of the slot side walls with ease (from above) and is beneficial from the viewpoint of qualitative maintenance of the slotted state. Although this configuration makes it possible to correct the positional deviation of light axis, it develops angular deviation and the loss due to the light receiving angle of the optical fiber must be taken into account within a predetermined tolerance. The angles of the slot walls on the light incoming and outgoing sides need not be symmetrical.

Figure 18:
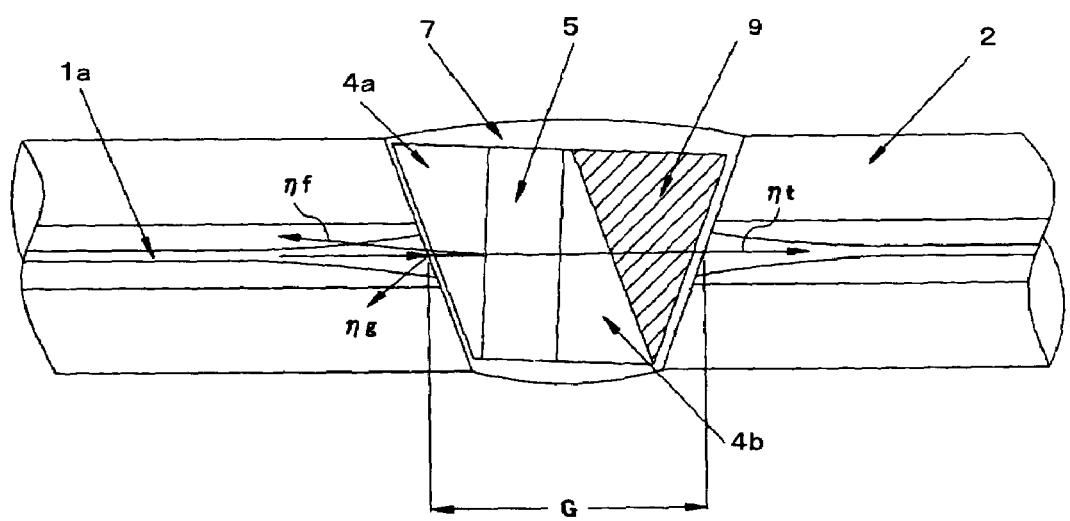
Figure 19:
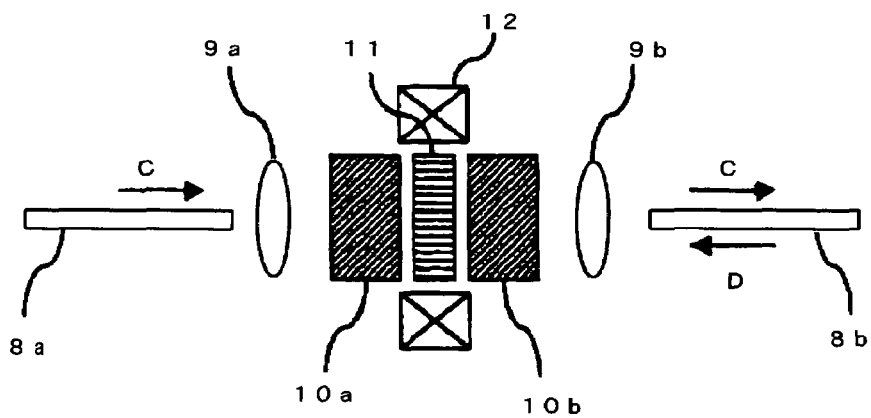

FIG. 18 shows an optical isolator as a further embodiment of the invention which is similar to the embodiment in FIG. 17 but is improved with regard to the angular deviation. A wedge 9 of a material having the same refractive index as the outgoing side polarizer 4b, e.g. silica glass or resin, is affixed to the polarizer 4b to provide a larger wedge having an upper side larger than the lower side. This tends to increase the fiber gap but the tendency is negligible compared with the loss due to the positional deviation of the light axis.

The modified structure permits the confirmation of slot wall conditions and additional machining for shape correction and is effective for the manufacture of high grade, high yield products.

In the embodiments shown in FIGS. 17 and 18, the plane inclined in the reverse direction to that of the optical element surface on the incoming side constitutes the surface on the outgoing side of the outgoing side polarizer 4b (FIG. 17) or the outgoing side surface of the wedge 9 (FIG. 18).

Embodiment 1

By way of example an optical isolator for the beam with a wavelength of 1.55 μm was experimentally fabricated as below.

Optical elements used were glass polarizer (manufactured by Corning Glass Works under the trade mark "Polarcore"), each piece measuring 10 mm×10 mm×0.5 mm thick, and a Faraday rotator (by TDK under the trade designation "BFG4A15") measuring 10 mm×10 mm ×0.37 mm thick.

1) The glass polarizer pieces on the incoming side and the outgoing side were machined beforehand for cutting angularly with respect to a reference plane so that the polarization direction of the glass polarizer could have such a relative angle to the Faraday rotator that the glass exhibit desired optical characteristics at 1.55 μm.

The glass elements were thus cut in rectangles 0.5 mm wide.

2) The cut rectangles of glass polarizer pieces on the incoming and outgoing sides were turned through 90° so that the cut side came to the top, and the minute metal particle-oriented layers on the both sides of the glass polarizer were divided into two. A cutting blade used then was a grindstone of metal #320 with a width of 100 μm.

3) The glass polarizer pieces on the incoming and outgoing sides were bonded to the Faraday rotator, with their minute metal particle-oriented layers in direct contact with the rotator.

For the above purpose a adhesive having a refractive index of 1.51 (the same as that of the glass polarizer) was used. The Faraday rotator was AR coated for adhesive.

4) The bonded rectangular optical elements (typical size: 0.5×10.0–t0.2) were obliquely ground until the glass polarizer formed a wedge at an angle of 5.6° to the shorter direction. (One side was first angularly ground and then using the ground surface as the reference plane the back side was ground.) The element so obtained had a thickness of 0.52 mm.

5) The optical element thus machined on both sides was cut across into a number of element pieces. The cut elements measured 0.5×0.4×0.52 mm each and were in the form of wedges at an angle of 5.6°.

6) Next, a zirconia ferrule having a diameter of 1.25 mm was employed as an external support, and a TEC optical fiber made by diffusing a refractive index-adjusting dopant in the core by local heating was inserted into the through hole of the ferrule and bonded in place. This fiber was designed to have a mode field diameter of 30 μm in the slot portion.

7) By means of a precision slicer a slot 550 μm wide was formed in the center of the ferrule at an angle of 5° to the direction perpendicular to the light axis.

8) The wedge-shaped optical element and the optical adhesive to fill up the space (with the same refractive index of 1.45 as the optical fiber) were put into the slot and allowed to be bonded and hardened securely.

9) Then a magnet capable of applying a magnetic field necessary for the optical element was located in place and bonded together.

10) The optical isolator thus fabricated was tested for its optical characteristics. The results were as follows:

The loss in the forward direction was measured to be in the range from 0.7 to 0.8 dB.

Because the experimentally made optical isolator was integrally combined with a ferrule connector, the above loss was inclusive of the connection loss of the connector.

The isolation at the peak wavelength ranged from 33 to 42 dB.

The actually measured values were much greater than the calculated range. This is presumably attributed to a larger extinction ratio of the specially machined glass polarizer than had been expected.

The return loss could be confirmed to be no less than 60 dB.

Although the actual values could hardly be obtained because of the sensitivity of the measuring instrument used, return loss in excess of 60 dB is a satisfactory level for an optical isolator.

It can be seen from the foregoing that an embedded optical isolator with adequate insertion loss and return loss and which may satisfactorily be used for LD module can be manufactured.

Embodiment 2

Figure 20:
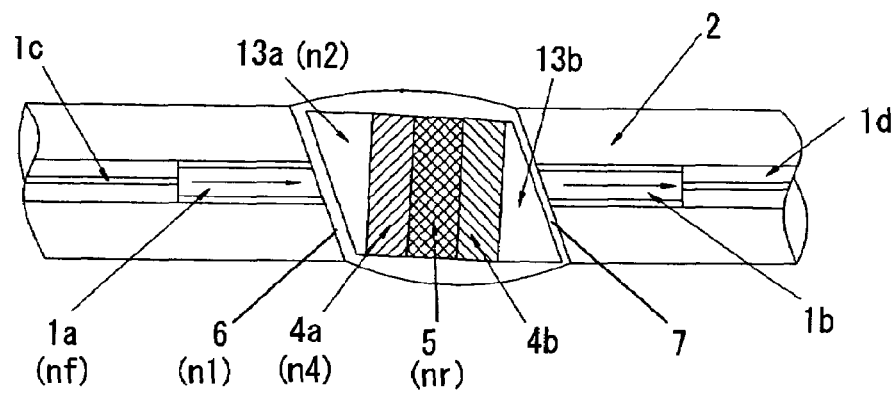
Figure 21:
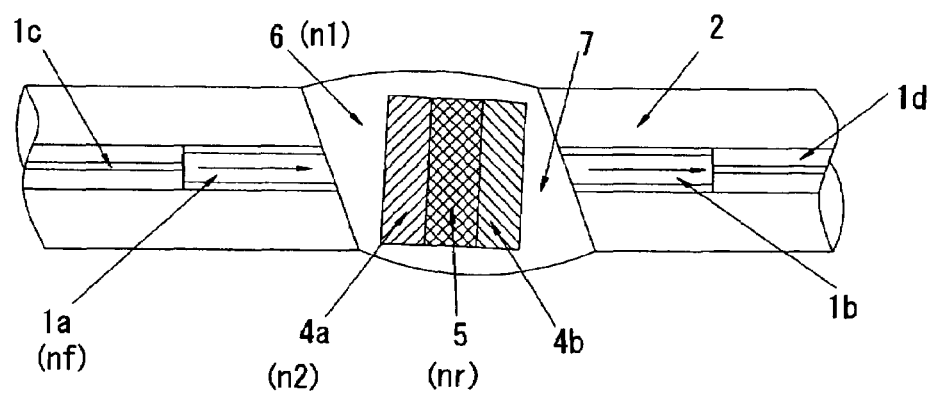

An optical isolator depicted in FIG. 20 was prepared.

This model was composed of an single mode optical fiber 1c, an incoming graded-index optical fiber 1a, a wedge-shaped glass 13a, an incoming side planer polarizer 4a, a planar Faraday rotator 5, an outgoing side planar polarizer 4b, a wedge-shaped glass 13b and an outgoing side graded-index optical fiber 1b and a single mode optical fiber 1d, arranged in this order, and an optical resin filling the space between walls of the slot and the optical wedge-shaped glass 13a and 13b. The wedge-shaped glass 13a, the incoming side planar polarizer 4a, the planar Faraday rotator 5, the outgoing side planar polarizer 4b and the wedge-shaped glass 13b were glued by a optical adhesive. The various parameters of these elements were as follows.

Wavelength: 1550 nm
Refractive index of the optical fiber 1a: nf=1.46
Distance between the incoming side optical fiber 1a to the Faraday
rotator 5: L=0.44 mm
Refractive index of the resin 6: n1=1.41
Refractive index of the wedge-shaped glass 13a: n2=1.51
Refractive index of the adhesive applied between the wedge-shaped glass 13a and the polarizer 4a: n3=1.51(<nr)
Refractive index of the polarizer 4a: n4=1.51
Refractive index of the adhesive between the polarizer 4a and the Faraday rotator: n5=1.51
Thickness of the resin 13a: L1=30 μm
Thickness of the wedge-shaped glass: L2=0.2 mm
Thickness of the adhesive between the wedge-shaped glass 13a and the polarizer 4a: L3=5 μm
Thickness of the polarizer 4a: L4=0.2 mm
Thickness of the adhesive between the polarizer 4a and the Faraday rotator 5: L5=5 μm
Refractive index of the Faraday rotator 5: nr=2.41
Thickness of the Faraday rotator: 0.45 mm
Width of the slot: 1.33 mm
From these parameters, we obtain the following result from the following calculation.

$$n1*L1/L+n2*L2/L+n3*L3/L+n4*L4/L+n5*L5/L=1.503$$

Accordingly, the relation $$nf<n1*L1/L+n2*L2/L+n3*L3/L+n4*L4/L+n5*L5/L<nr$$

is satisfied and a design was made possible to obtain the minimum connection loss with such conditions that the angle of the slot was at 12 degrees, the angle of the wedge of the polarizer was 14.3 degrees and the angle of the Faraday rotator as measured from the plane normal to the light axis in the opposite direction away from the slanted wall of the slot on the incoming side was 2.3 degrees.

Embodiment 3

An optical isolator illustrated in FIG. 20 was prepared.

This model was composed of an incoming side single mode optical fiber 1c, an incoming side graded-index optical fiber 1a, a wedge-shaped resin area 6, an incoming side planer polarizer 4a, a planar Faraday rotator 5, an outgoing side planar polarizer 4b, an outgoing side wedge-shaped resin 7, an outgoing side graded-index optical fiber 1b and an outgoing side single mode optical fiber 1d, arranged in this order. The wedge-shaped optical resin filled the space between walls of the slot and the polarizers 4a and 4b. The wedge-shaped glass 13a, the incoming side planar polarizer 4a, the planar Faraday rotator 5, the outgoing side planar polarizer 4b and the wedge-shaped glass 13b were glued by a optical adhesive. The various parameters of these elements were as follows.

Wavelength: 1550 nm
Refractive index of the optical fiber 1a: nf=1.46
Distance between the incoming side optical fiber 1a to the Faraday
rotator 5: L=0.855 mm
Refractive index of the resin 6: n1=1.48
Refractive index of the polarizer 4a: n2=1.51(<nr)
Refractive index of the adhesive between the polarizer 4a and the Faraday rotator: n3=1.51
Thickness of the resin 6: L1=0.35 μm (along the axis of the optical fibers)
Thickness of the polarizer 4a: L2=0.5 mm
Thickness of the adhesive between the polarizer 4a and the Faraday rotator 5: L3=5 μm
Refractive index of the Faraday rotator: nr=2.41
Thickness of the Faraday rotator: 0.45 mm
Width of the slot: 2.15 mm
From these parameters, we obtain the following result by calculation.

$$n1*L1/L+n2*L2/L+n3*L3/L+L=1.498$$

Accordingly, the relation $$nf<n1*L1/L+n2*L2/L+n3*L3/L<nr$$

is satisfied and a design was made possible to obtain the minimum loss with such conditions that the angle of the slot was at 12 degrees, and the angle of the Faraday rotator as measured from the plane normal to the light axis in the opposite direction away from the slanted wall of the slot on the incoming side was 2.7 degrees.

As has been described above, the present invention provides an embedded type optically irreversible circuit device which is capable of not only correcting the light axis deviation and controlling the increase in loss but also achieving return loss.

We claim:

1. An optical isolator comprising an optical element comprised of an incoming side polarizer, a Faraday rotator and an outgoing side polarizer superposed in this order in the direction of an optical path, in an optical fiber or optical waveguide having a substantially straight light axis, a slot defined by a pair of walls extending across the optical fiber or optical waveguide in a direction slanted at a slant angle with respect to the light axis, the optical element being inserted in the slot, and spaces between the optical element and the walls defining the slot being filled with optical adhesive portions, and at least one of interfaces between the incoming side polarizer, the Faraday rotator, the outgoing side polarizer and the optical adhesive portions being inclined at an angle opposite to the wall on the an incoming side of the slot as measured from a plane normal to the light axis.

2. The optical isolator according to claim 1 wherein the incoming side and the outgoing side polarizers are wedge-shaped, the polarizers have first planes facing the optical fiber or waveguide and second planes facing the Faraday rotator, the first planes being inclined substantially in the same direction as the slant angle of the walls of the slot, the second planes facing the Faraday rotator as well as both planes of the Faraday rotator being inclined at an angle opposite to the wall slanted at the slant angle on the incoming side of the slot, respectively, as measured from a plane normal to the light axis, and the both planes of the Faraday rotator are joined integrally to the second planes of the incoming and outgoing side polarizers.

3. The optical isolator according to claim 1 or 2, wherein the polarizers are pieces of glass polarizer each comprising a layer of minute spheroidal metal particles oriented and formed on either side of a glass substrate in the direction of the optical path.

4. The optical isolator according to claim 3, wherein the glass polarizer has minute spheroidal metal particles oriented in layers 30 to 80 $\mu$m thick.

5. The optical isolator according to claim 1, wherein the optical element is comprised of a first birefringent region, a second birefringent region, and a first adhesive region bonding the first and second birefringent regions together on one side of a Faraday rotator, a third birefringent region aligned to the first birefringent region, a fourth birefringent region aligned to the second birefringent region, and a second adhesive region bonding the third and fourth birefringent regions together on the other side of the Faraday rotator.

6. The optical isolator according to claim 1 or 2, wherein the optical fiber or optical waveguide has an expanded core portion and said slot extends across the expanded core portion.

7. The optical isolator according to claim 3, wherein the optical fiber or optical waveguide has an expanded core portion and said slot extends across the expanded core portion.

8. The optical isolator according to claim 4, wherein the optical fiber or optical waveguide has an expanded core portion and said slot extends across the expanded core portion.

9. The optical isolator according to claim 5, wherein the optical fiber or optical waveguide has an expanded core portion and said slot extends across the expanded core portion.

10. The optical isolator according to claim 1 or 2 wherein refractive indexes of the optical fiber or wave guide, the optical adhesive portions, the incoming side polarizer, the Faraday rotator, and the outgoing side polarizer are in the relation: the optical fiber or waveguide $n0 \leq$ the optical adhesive $n1 \leq$ the incoming side polarizer $n2a$ and the outgoing side polarizer $n2b <$ the Faraday rotator $n3$, and the Faraday rotator is inclined at an angle opposite to the slanted wall on the incoming side of the slot as measured from a plane normal to the light axis.

11. The optical isolator according to claim 3 wherein the refractive indexes of the optical fiber, the optical adhesive portions, the incoming side polarizer, the Faraday rotator, and the outgoing side polarizer are in the relation: the optical fiber $n0 \leq$ the optical adhesive $n1 \leq$ the incoming side polarizer $n2a$ and the outgoing side polarizer $n2b <$ the Faraday rotator $n3$, and the Faraday rotator is inclined at an angle opposite to the slanted wall on the incoming side of the slot as measured from a plane normal to the light axis.

12. The optical isolator according to claim 4 wherein the refractive indexes of the optical fiber, the optical adhesive portions, the incoming side polarizer, the Faraday rotator, and the outgoing side polarize are in the relation: the optical fiber $n0 \leq$ the optical adhesive $n1 \leq$ the incoming side polarizer $n2a$ (=outgoing side polarizer $n2b$)< the Faraday rotator $n3$, and the Faraday rotator is inclined at an angle opposite to the slanted wall on the incoming side of the slot as measured from a plane normal to the light axis.

13. The optical isolator according to claim 5 wherein refractive indexes of the optical fiber, the optical adhesive portions, the incoming side polarizer, the Faraday rotator, and the outgoing side polarizer are in the relation: the optical fiber $n0 \leq$ the optical adhesive $n1 \leq$ the incoming side polarizer $n2a$ (=outgoing side polarizer $n2b$)< the Faraday rotator $n3$, and the Faraday rotator is inclined at an angle opposite to the slanted wall on the incoming side of the slot as measured from a plane normal to the light axis.

14. The optical isolator according to claim 6 wherein refractive indexes of the optical fiber, the optical adhesive portions, the incoming side polarizer, the Faraday rotator, and the outgoing side polarizer are in the relation: the optical fiber $n0 \leq$ the optical adhesive $n1 \leq$ the incoming side polarizer $n2a$ and the outgoing side polarizer $n2b <$ the Faraday rotator $n3$, and the Faraday rotator is inclined at an angle opposite to the slanted wall on the incoming side of the slot as measured from a plane normal to the light axis, and the optical fiber or optical waveguide has an expanded core portion and said slot extends across the expanded core portion.

15. The optical isolator according to claim 7 wherein refractive indexes of the optical fiber, the optical adhesive portions, the incoming side polarizer, the Faraday rotator, and the outgoing side polarizer are in the relation: the optical fiber $n0 \leq$ the optical adhesive $n1 \leq$ the incoming side polarizer $n2a$ and the outgoing side polarizer $n2b <$ the Faraday rotator $n3$, and the Faraday rotator is inclined at an angle opposite to the slanted wall on the incoming side of the slot as measured from a plane normal to the light axis.

16. The optical isolator according to claim 8 wherein refractive indexes of the optical fiber, the optical adhesive portions, the incoming side polarizer, the Faraday rotator, and the outgoing side polarizer are in the relation, the optical fiber $n0 \leq$ the optical adhesive $n1 \leq$ the incoming side polarizer $n2a$ and the outgoing side polarizer $n2b <$ the Faraday rotator $n3$, and the Faraday rotator is inclined at an angle opposite to the slanted wall on the incoming side of the slot as measured from a plane normal to the light axis.

17. The optical isolator according to claim 9 wherein refractive indexes of the optical fiber, optical adhesive portions, incoming side polarizer, Faraday rotator, and outgoing side polarizer in which the device comprises are in the relation, optical fiber $n0 \leq$ optical adhesive $n1 \leq$ incoming side polarizer $n2a$ (=outgoing side polarizer $n2b$)<Faraday rotator $n3$, and the Faraday rotator is inclined at an angle opposite to the slanted wall on the incoming side of the slot as measured from a plane normal to the light axis.

18. An optical isolator comprising an optical element comprised of an incoming side polarizer, a Faraday rotator and an outgoing side polarizer superposed in this order in the direction of an optical path in an optical fiber or optical waveguide having a substantially straight light axis, a slot defined by a pair of walls extending across the optical fiber or optical waveguide, the walls on the incoming and outgoing sides being reversely inclined to the direction of the light axis, the optical element being inserted in the slot, and optical adhesive portions formed by an optical adhesive filling the space between the optical element and the walls at least one of interfaces between the incoming side polar izer, the Faraday rotator, the outgoing side polarizer and the optical adhesive portions being inclined at an angle opposite to the wall on the incoming side of the slot as measured from a plane normal to the light axis.

19. An optical isolator comprising an optical element comprised of a plurality of incoming side optical members, a Faraday rotator and a plurality of outgoing side optical members superposed in this order in the direction of an optical path, an optical fiber or optical waveguide having a light axis, a slot defined by a pair of walls extending across the optical fiber or optical waveguide in a direction slanted at a slant angle with respect to the light axis, the optical element being inserted in the slot, and spaces between the optical element and the walls defining the slot being filled with optical adhesive portions, at least one of interfaces between the incoming side optical members, the Faraday rotator, the outgoing side optical members and the optical adhesive portions being inclined at an angle opposite to the wall on an incoming side of the slot as measured from a plane normal to the light axis, in such manner tat the following relationship is satisfied:

$$nf < n1*L1/L + n2*L2/L + n3*L3/L + \ldots < nr$$

where nf: refractive index of the optical fiber,
L: distance from an incoming side optical fiber to the Faraday rotator,
n1, n2, n3...: refractive indexes of the optical members inserted between the incoming side optical fiber and the Faraday rotator,
L1, L2, L3...: Thickness of materials inserted between the incoming side optical fiber and the Faraday rotator,
nr: refractive index of the Faraday rotator, the materials inserted between the incoming side optical fiber to the Faraday rotator are comprised of a polarizer and refractive index of the polarizer is no more than refractive index of the Faraday rotator.

20. The optical isolator according to claim 19, wherein the optical element comprises an incoming side wedge-shaped glass and an incoming side planar polarizer as the incoming side optical members, the Faraday rotator, an outgoing side planar polarizer and an outgoing side wedge-shaped glass as the outgoing side optical members, superposed in this order, and an optical resin filling space between the walls defining the slot and the optical element.

21. The optical isolator according to claim 19, wherein the incoming side optical members comprise a wedge-shaped resin area, an incoming side planar polarizer, and an outgoing side planar polarizer, an outgoing side wedge-shaped resin, superposed together with the Faraday rotator in this order.

* * * * *